United States Patent
Pollock et al.

(10) Patent No.: US 12,019,203 B2
(45) Date of Patent: Jun. 25, 2024

(54) DEVICE AND METHOD FOR SCANNING ITEMS

(71) Applicant: ICONAL TECHNOLOGY LTD., Cambridge (GB)

(72) Inventors: Samuel Pollock, Cambridge (GB); Michael Charles Kemp, Cambridge (GB); George Vardulakis, Cambridge (GB); Ryan Jenkinson, Cambridge (GB)

(73) Assignee: Iconal Technology Ltd., Cambridge (GB)

( * ) Notice: Subject to any disclaimer, the term of this patent is extended or adjusted under 35 U.S.C. 154(b) by 437 days.

(21) Appl. No.: 17/293,318

(22) PCT Filed: Nov. 11, 2019

(86) PCT No.: PCT/EP2019/080890
§ 371 (c)(1),
(2) Date: May 12, 2021

(87) PCT Pub. No.: WO2020/099335
PCT Pub. Date: May 22, 2020

(65) Prior Publication Data
US 2022/0011461 A1    Jan. 13, 2022

(30) Foreign Application Priority Data
Nov. 13, 2018  (GB) ..................................... 1818511

(51) Int. Cl.
*G01V 5/00*    (2006.01)
*G01B 11/22*   (2006.01)
(Continued)

(52) U.S. Cl.
CPC ............ *G01V 5/0041* (2013.01); *G01B 11/22* (2013.01); *G01S 13/865* (2013.01); *G01S 13/887* (2013.01)

(58) Field of Classification Search
CPC ..... G01V 5/0041; G01B 11/22; G01S 13/865; G01S 13/887
See application file for complete search history.

(56) References Cited

U.S. PATENT DOCUMENTS

2003/0231739 A1    12/2003  Rosner
2006/0146377 A1*    7/2006  Marshall ............... G06T 3/4038
                                                        358/486

(Continued)

FOREIGN PATENT DOCUMENTS

| | | |
|---|---|---|
| EP | 13171970 A2 | 12/2003 |
| GB | 2541680 | 3/2017 |
| WO | 2008/083138 A1 | 7/2008 |

OTHER PUBLICATIONS

UKIPO Search Report, issued in GB 1818511.6, dated May 10, 2019, 5 pages.

(Continued)

*Primary Examiner* — Hugh Maupin
(74) *Attorney, Agent, or Firm* — Mughal Gaudry & Franklin PC (57) ABSTRACT

A device, a method, and a kit for screening items of baggage. The device comprising: an x-ray scanner, configured to scan an item of baggage using x-ray radiation, and generate therefrom data indicative of objects within the item of baggage; a second scanner configured to estimate a volume of the item of baggage; a third scanner, configured to estimate a physical dimension of at least one object within the item of baggage, wherein the third scanner uses non-ionising radiation; and a processor, configured to utilize the data indicative of objects within the item of baggage, the (Continued)

estimated volume, and the estimated physical dimension of at least one object within the item of baggage to generate a risk estimation for the item of baggage.

23 Claims, 9 Drawing Sheets

(51) Int. Cl.
*G01S 13/86* (2006.01)
*G01S 13/88* (2006.01)

(56) References Cited

U.S. PATENT DOCUMENTS

| | | |
|---|---|---|
| 2014/0333326 A1 | 11/2014 | Peschmann et al. |
| 2015/0060673 A1* | 3/2015 | Zimdars ............... G01V 5/0016 |
| | | 250/341.2 |
| 2016/0025888 A1* | 1/2016 | Peschmann ............ G01V 5/005 |
| | | 378/57 |
| 2019/0072663 A1* | 3/2019 | Kuznetsov ............. H01Q 13/06 |
| 2020/0158860 A1* | 5/2020 | Morton .................... G01V 3/12 |

OTHER PUBLICATIONS

International Search Report and Written Opinion issued in PCT/EP2019/080890, dated Jan. 31, 2020.

* cited by examiner

DEVICE AND METHOD FOR SCANNING ITEMS

CROSS-REFERENCE TO RELATED APPLICATIONS

This application is a U.S. National Stage of International Application No. PCT/EP2019/080890, filed Nov. 11, 2019, which claims priority to Great Britain Application No. 1818511.6, filed Nov. 13, 2018, which are hereby incorporated by reference in their entireties for all purposes.

FIELD OF THE INVENTION

The present invention relates to a device, method, and kit for scanning items of baggage.

BACKGROUND

X-ray cabin baggage screening is the cornerstone of aviation security, but does not transfer well to high throughput applications. One reason for this is due to the relatively low belt speeds; the need for human screeners to interpret complex item of baggage images; the high-cost overhead of providing sufficient staff to operate systems; and large bulky machinery and high false alarm rates. As a consequence, there is a need for a low cost, compact, high-throughput x-ray system to automatically screen bags in high throughput screening applications, such as at sporting or entertainment venues.

SUMMARY

Accordingly, in a first aspect, the invention provides a device for screening items of baggage, comprising:
- an x-ray scanner, configured to scan an item of baggage using x-ray radiation and generate therefrom data indicative of objects within the item of baggage;
- a second scanner, configured to estimate a volume of the item of baggage;
- a third scanner, configured to estimate a physical dimension of at least one object within the item of baggage, wherein the third scanner uses non-ionising radiation; and
- a processor, configured to utilize the data indicative of objects within the item of baggage, the estimated volume, and the estimated physical dimension of at least one object within the item of baggage to generate a risk estimation for the item of baggage.

A device according to the first aspect can be operated quickly and automatically, and has been shown to provide a good level of accuracy in classifying items of baggage as either containing threat or benign items. Examples of the device have been shown to screen items of baggage within 3 seconds, giving a throughput of 1200 bags per hour.

The third scanner may be configured to derive one or more additional physical properties pertaining to at least one object within the item of baggage. The one or more physical properties may include a complex dielectric constant of the or each object, electromagnetic scattering behaviour, and structural elements causing multiple reflections.

The device may further comprise a conveyor, configured to move the item of baggage between a first scanning region associated with the first scanner, a second scanning region associated with the second scanner, and a third scanning region associated with the third scanner. The first, second, and/or third scanning regions may partially or completely overlap. The device may further comprise a conveyor which moves the item of baggage being screened from an input region of the device to an output region of the device. The conveyor may be configured to move the item of baggage at a speed greater than 0.2 m/s, greater than 0.3 m/s, greater than 0.4 m/s, greater than 0.5 m/s, or at least 0.6 m/s. Preferably the conveyor is configured to move the item of baggage at a speed of at least 0.4 m/s and no more than 0.8 m/s.

The data indicative of objects within the item of baggage may be an indication of a number of different objects within the item of baggage. The data indicative of objects within the item of baggage may be an indication of a density of the or each object within the item of baggage.

The second scanner may use non-ionising radiation. The second scanner may be an optical depth sensor, for example a 2D, or preferably a 3D optical depth sensor. The second scanner may be a time of flight sensor. The second scanner may, in some examples, use any one or more of: stereo imaging, LIDAR, and structured light. The device may further comprise a mirror, configured to reflect light emitted from the optical depth sensor onto a second scanning region. As such, the device can be made more compact.

The third scanner may be a radar scanner. The third scanner may be a microwave radar scanner. The microwave radar scanner may operate at frequencies of at least 1 GHz, and preferably at least 1.5 GHz. The microwave scanner may operate at frequencies of no more than 200 GHz, and preferably no more than 150 GHz.

The majority of materials used to make items of baggage (and clothing) are transparent to microwaves, and so the radar will only interact with significant objects within the item of baggage, such as books, bottles of water, potential explosives and metallic items. This allows an estimation of the distance from the microwave radar scanner to the closest surface of a microwave-interacting (for example, microwave reflective or scattering) object within the item of baggage.

The third scanner may be configured to estimate the physical dimension of at least one object within the item of baggage whilst the item of baggage is also being scanned by the second scanner.

The physical dimension of the object may be a depth of the object relative to a surface of the item of baggage closest to the third scanner.

The processor may be configured to identify regions of interest in the item of baggage using a measured attenuation of the x-ray radiation.

The processor may be configured to identify organic regions, inorganic regions, and/or metallic regions in the item of baggage using a measured effective atomic number derived from x-rays of different energies. The processor may be configured to derive an estimation of the mass of the or each object within the item of baggage using data from the x-ray scanner. The mass may be estimated using an integration of the area of the or each object and the log of the attenuation for that object.

The processor may be configured to determine the likelihood that one or more objects within the item of baggage contains water. This determination may be performed using a measured effective atomic number derived from the x-ray scanner, optionally in conjunction with the effective mass. In this manner the processor can ascertain if an item of baggage contains one or more bottles of water, and so decrease the rate of false positives encountered. By water, it may be meant a liquid which is predominantly or chiefly water, and would include for example water-based beverages.

The processor may be configured to generate a feature vector, using one or more of: an estimated mass and area of organic and/or dense objects within the item of baggage, a number of discrete metallic, organic, and/or inorganic objects within the item of baggage, an estimation of the degree to which the item of baggage is filled by the or each object contained therein, and an estimated volume of the or each object contained within the item of baggage; and utilise the feature vector to generate the risk estimation for the item of baggage. The feature vector may also include an indication as to the likelihood that one of more objects within the item of baggage contains water.

The processor may be configured to use a machine learning algorithm to generate the risk estimation. The machine learning algorithm may be a decision tree or a neural network.

The processor may be configured to identify features of the item of baggage, based on the data indicative of objects within the item of baggage and the estimated volume of the item of baggage, characteristic of the item of baggage either being benign or containing a threat.

The processor may be configured to generate an attenuation/$Z_{eff}$ histogram using the data indicative of objects within the item of baggage, and may be configured to use the attenuation/$Z_{eff}$ histogram when generating the risk estimation for the item of baggage. The attenuation/$Z_{eff}$ histogram may be used instead of or in addition to the feature vector discussed previously. When used in addition, the processor may be configured to generate a first risk estimation using the feature vector and a second risk estimation using the attenuation/$Z_{eff}$ histogram and combine the two. Alternatively, when used in addition the processor may be configured to use features of the attenuation/$Z_{eff}$ histogram in the feature vector used to generate the risk estimation.

In a second aspect, the invention provides a method of screening items of baggage, using a device, comprising the steps of:
scanning the item of baggage using an x-ray scanner and thereby generating data indicative of objects within the item of baggage;
estimating the volume of the item of baggage using a second scanner;
estimating a physical dimension of at least one object within the item of baggage using a third scanner, wherein the third scanner uses non-ionising radiation; and
generating, by a processor, a risk estimation based on the data indicative of objects within the item of baggage, the estimated volume, and the estimated physical dimension of at least one object within the item of baggage.

The method of the second aspect may use the device of the first aspect. The device as used in the second aspect may have any or indeed all of the optional features discussed with respect to the first aspect, insofar as they are compatible with one another.

In a third aspect, the invention provides a kit, installable in an x-ray scanner, comprising:
an optical depth sensor, configured to estimate a volume of an item of baggage;
a radar scanner, configured to estimate a physical dimension of at least one object within the item of baggage; and
a processor, configured to utilize:
 data indicative of objects within the item of baggage, which is provided by the x-ray scanner,
 the estimation of the volume of the item of baggage, and
 the estimation of a physical dimension of at least one object within the item of baggage;
so as to generate a risk estimation for the item of baggage.

The kit of the third aspect may have any, or indeed all, of the optional features discussed with respect to the first aspect, insofar as they are compatible with one another.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
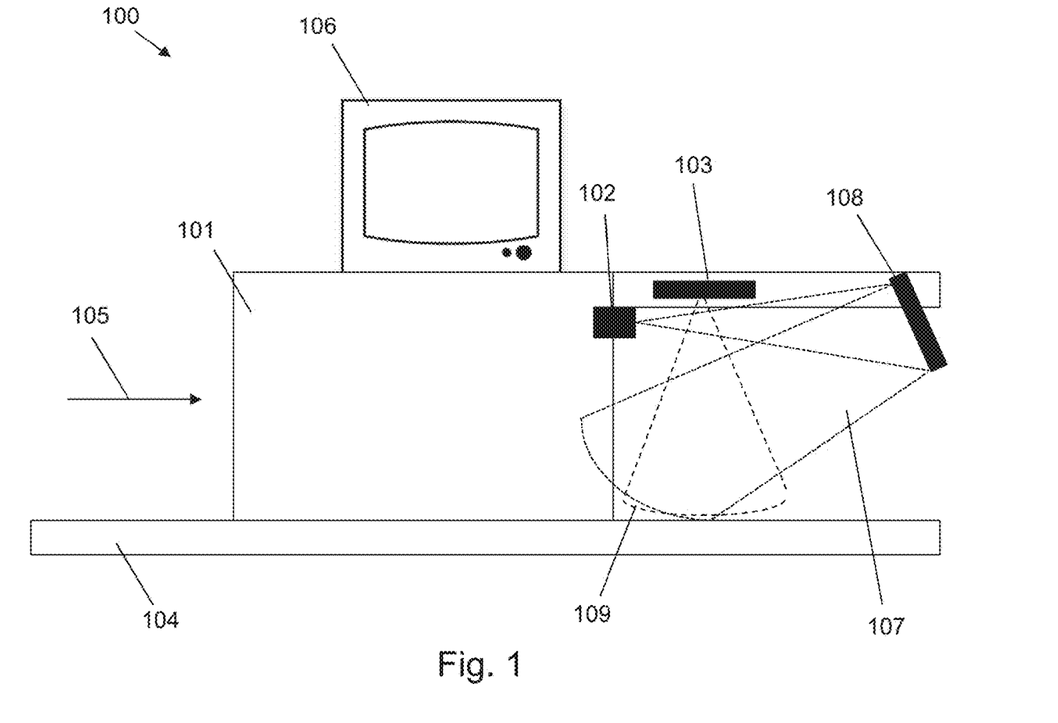
FIG. 1 shows a device including an x-ray scanner, an optical sensor, and a radar sensor.

Aspects and embodiments of the present invention will now be discussed with reference to the accompanying figures. Further aspects and embodiments will be apparent to those skilled in the art. All documents mentioned in this text are incorporated herein by reference FIG. 1 shows a device 100 suitable for screening items of baggage. The device includes an x-ray scanner 101, an optical sensor 102, a radar sensor 103, and a conveyor belt 104. In use, an item of baggage is placed on the conveyor belt 104 adjacent to an entrance to the x-ray scanner. The conveyor belt carries the item of baggage in direction 105, towards a housing. The x-ray scanner is contained within the housing. The housing is, as expected, lead-lined with lead curtains over an entrance and exit. In alternative examples, not shown, there is no lead-lining or lead curtains.

As the conveyor belt moves the item of baggage through the x-ray scanner 101, x-rays are produced by an x-ray tube and pass through the item of baggage before impinging on two x-ray detectors in the manner known per se in the art. The results of this scan may be displayed on screen 106. Alternatively, the screen, or a display device, may instead only display an indication as to whether the scanned item of baggage is considered to contain a threat object or whether it is considered to contain only benign objects. The display device may be, for example, a red light denoting that the item of baggage is deemed to contain a threat object or a green light denoting that the item of baggage is deemed to contain only benign objects.

In this example, after the item of baggage has been scanned by the x-ray scanner it exits the housing and enters a scanning region 107. In other examples, scanning region 107 overlaps with the scanning region of the x-ray scanner. Whilst in this scanning region 107, the optical depth sensor 102 estimates the volume of the item of baggage. In this example the optical depth sensor is an optical depth sensor and particularly a time-of-flight sensor, and therefore produces light in the infrared range. This light reflects from the item of baggage, and its time of flight is registered by the time-of-flight sensor. From these readings, as will be discussed below, an estimation of the volume of the item of baggage can be derived. In this example, the optical depth sensor 102 is directed towards a mirror 108, which reflects light transmitted from the optical depth sensor 102 into scanning region 107. Similarly, light reflected from the item of baggage being scanned is again reflected via mirror 109 back towards the optical depth sensor 102. In examples where the optical depth sensor is a 2D optical sensor, it may build a volume profile of the item of baggage by scanning along a fixed line as the item of baggage passes along the conveyor belt. By combining the scans, the 2D optical sensor can produce a 3D depth profile of the item of baggage (and so derive the volume thereof).

At the same time, radar sensor 103 (in this example a microwave radar transmitter and receiver) emits radio waves (e.g. radar or microwaves) some of which penetrate through an outer surface of the item of baggage. The radar sensor 103 has its own scanning region 109, which in this example overlaps with the scanning region 107 associated with the optical depth sensor.

A portion of these radio waves will reflect at each interface in the item of baggage which has a change in refractive index. Therefore, by measuring properties of the received return signals from the radio waves, an indication of at least one physical dimension of objects within the item of baggage can be generated. For example, a portion of the radio waves entered the item of baggage will reflect from an uppermost surface of an object within the bag. As the volume of the item of baggage has been estimated, and its upper surface area known from at least one of the x-ray scanner and the time-of-flight sensor, an estimation of the height of the item of baggage (as measured from an upper surface of the conveyor belt) can be generated. By comparing the height of the item of baggage to the measured depth of an object within the item of baggage (as compared to the surface closest to the radar sensor 103), an indication of the physical dimensions of at least one object in the item of baggage can be derived.

For example, if a height of the item of baggage has been estimated as 25 cm (either via measurements taken from one or both of the 3D sensor and radar or by calculation from a measured volume and cross-sectional area) and the radar sensor 103 senses an object 10 cm below the upper surface of the item of baggage, it can be calculated that the object has a height as measured from the lower most surface of the item of baggage of 15 cm. Further, as the cross-sectional area of the object will be derivable from the x-ray scan, a volume of the object can be estimated.

A processor, connected to each of the x-ray scanner 101, optical depth sensor 102, and radar sensor 103, receives data from each. The processor may perform the calculations discussed above, or may, instead, receive the results of these calculations which have been performed by processors located in each of the sensors.

The processor makes a determination, based on the data received, as to whether the bag contains a threat based on a number of indicators. These indicators may include, for example, the estimated number, dimensions, and/or physical properties of objects in the bag. The specific nature of indicators attributable to a threat object is known per se to the skilled person.

The conveyor belt is set at a speed of at least 0.2 m/s, and preferably at least 0.6 m/s. This is significantly faster than conventional conveyor belts used with standard security x-ray scanning systems.

Figure 2:
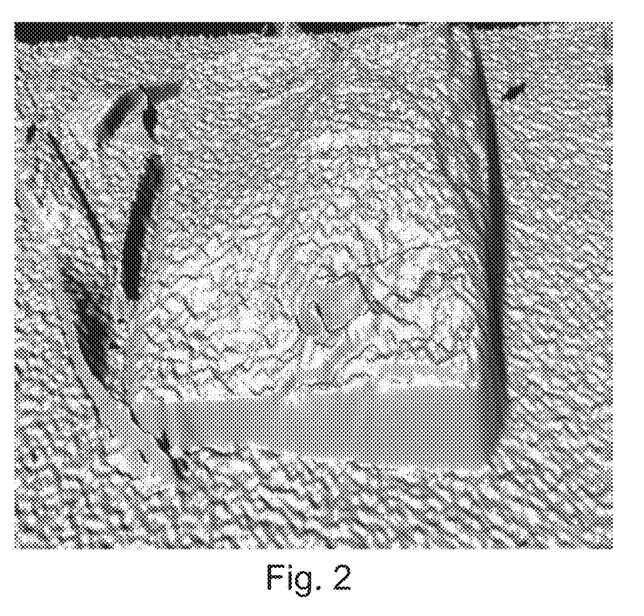
FIG. 2 shows an image from the 3D optical sensor of an item of baggage.

FIG. 2 shows input images from the optical depth sensor 102, when the optical sensor is a time of flight sensor. FIG. 2 shows an image captured from a single exposure, also known as a surface map. It was found that a single exposure was quite noisy as can be seen in FIG. 2, with approximately 2 cm of noise on each pixel. It can be useful then to average over several exposures, to produce a relatively clean image.

An estimated volume of the item of baggage can be achieved from either of these images. A baseline measurement, indicative of the surface on which the item of baggage sits, can be taken or calculated. This baseline measurement can then be used in an estimation of the volume of the item of baggage.

Figure 3:
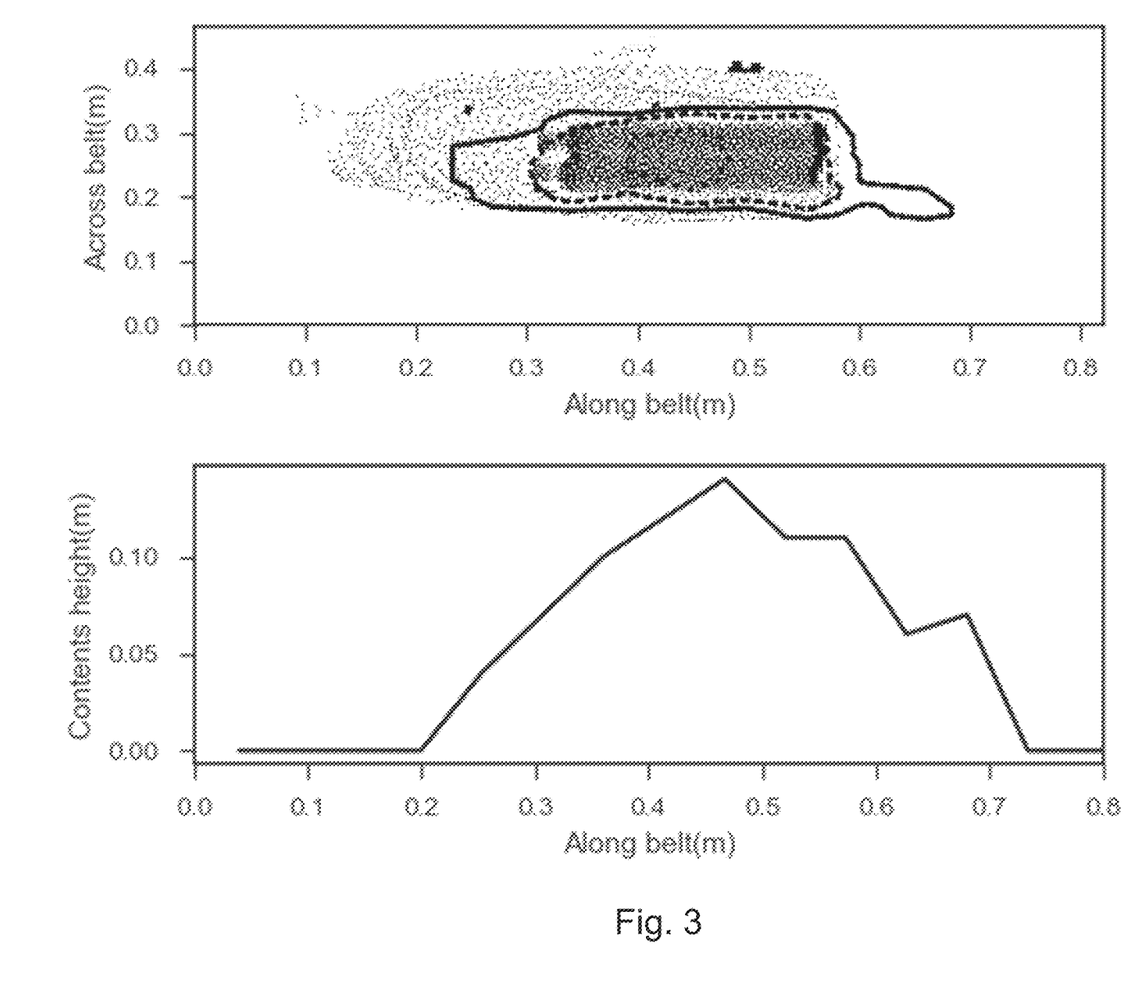
FIG. 3 shows a radar image of an item of baggage as obtained from the radar sensor, the upper plot shows total reflected radar signal as a heat map overlaid on a corresponding x-ray image and the lower plot shows the integrated radar measurement of depth along the length of the item of baggage (co-registered with the upper plot)

FIG. 3 shows a radar image of an item of baggage containing two 1 L bottles of water. The upper plot shows a radar heat map overlaid on the corresponding x-ray image (with inner circles denoting higher intensity). The lower plot shows the integrated radar measurement of depth (i.e. distance from the scanner to microwave-opaque object) along the length of the bag (co-registered with the upper plot).

Figure 4A:
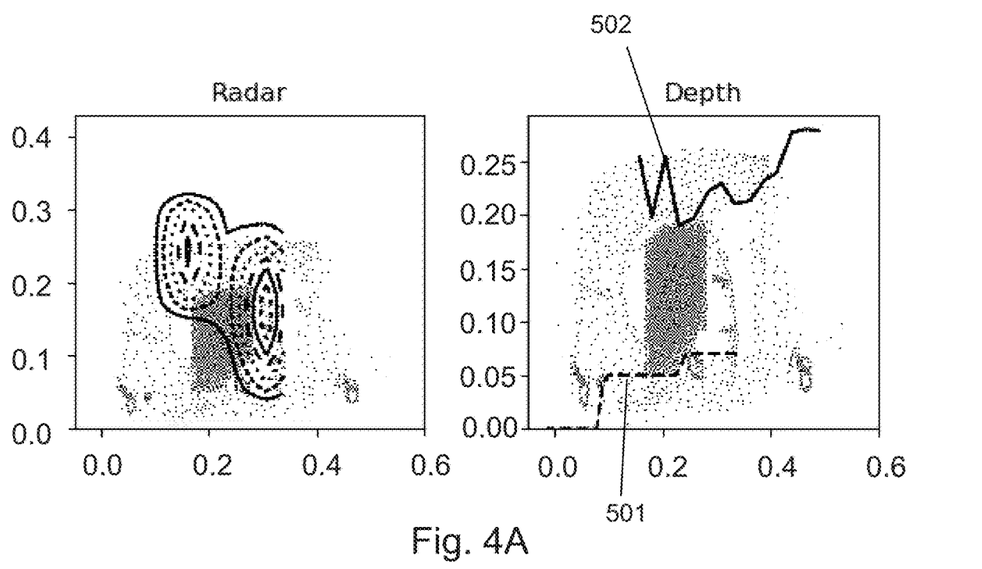
FIG. 4A shows two x-ray images of an item of baggage known to contain threat objects, the left-hand plot showing a radar heat map of reflection intensity and the right-hand plot showing a depth map.

FIG. 4A shows two x-ray images of items of baggage known to contain threat objects. The left-hand plot shows a radar map of reflection intensity (i.e. total reflected signal), and the right-hand plot shows a depth map. Two profiles are plotted on the depth map: the radar 501 and the optical 502 measurement of depth (e.g. by the optical depth sensor). The difference between these two measurements is indicative of the level of fill within the item of baggage. It can be seen from these images that the bags predominantly contain air, and the objects within the item of baggage reach a depth of around 10 cm, suggesting high density materials. The density can be estimated by first estimating the mass of the or each object (by taking an integration of the area of the object and the log of the attenuation), and using the depth as measured by the radar scanner.

Figure 4B:
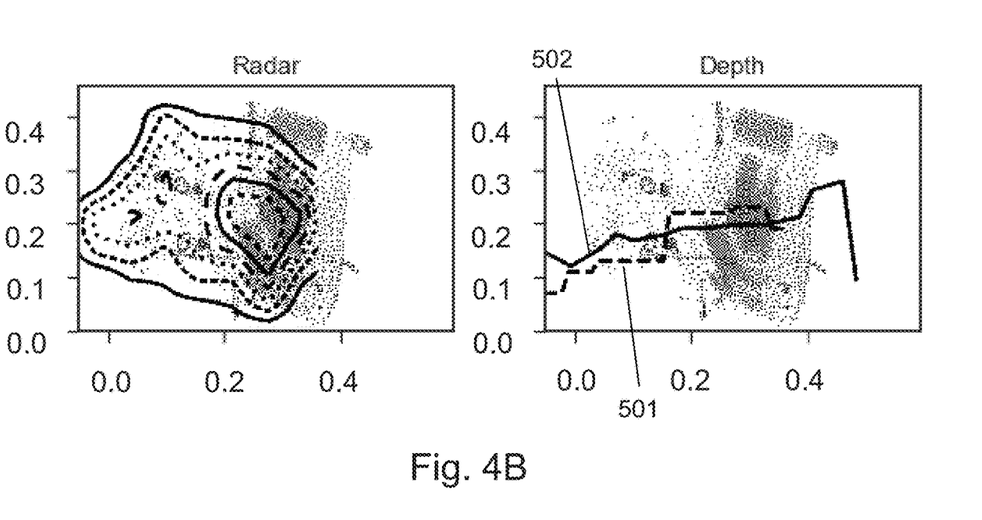
FIG. 4B shows two x-ray images of an item of baggage known to contain only benign objects, the left hand image showing a radar heat map of reflection intensity and the right hand image showing a depth map.

FIG. 4B shows two x-ray images of items of baggage known to contain only benign objects. Again, the left-hand plot shows a radar heat map of reflection intensity, and the right-hand plot shows a depth map. Two profiles are plotted on the depth map: the radar 501 and the optical 502 measurement of depth. Again, the difference between these two measurements is indicative of the level of fill within the item of baggage. It can be seen from these images that the bags contain a reasonable amount of dense material, but the radar maps indicate that the objects are distributed throughout the item of baggage, with large amount of vertical space between them.

Data gathered using the x-ray scanner, microwave radar scanner, and time-of-flight scanner (i.e. optical depth sensor) is provided to one or more processors. These processors may be installed locally, within the device, or may be connected to the device over a network. The processors use any one, any combination, or all of the following algorithms: a pre-processing and feature extraction algorithm, and a classification algorithm.

The pre-processing and feature extraction algorithm receives raw sensor and X-ray data, cleans and filters it, and identifies features which are expected to be characteristic of objects in the item of baggage being either benign or threat type objects. The classification algorithm receives raw data or processed features to make benign/threat classifications on a given item of baggage.

Generally, the algorithm operates as follows:
(1) Import data from the respective scanners, and optionally clean the data using appropriate filters (for example, spatial averaging, correcting for known geometric distortions and/or discarding invalid measurements);
(2) Align the data from each of the scanners, e.g. the x-ray, radar, and optical depth data, using timing information, to create a fused multi-sensor data set;
(3) Process the fused multi-sensor data set using filtering techniques known per se in the art, to thereby identify regions of the bag and objects with specific characteristics of interest, and reject or ignore areas which are not of interest, using parameters such as: density, size, atomic number, etc.;
(4) Extract a pre-determined set of numerical features from the data to create a feature vector, said feature vector representing the perceived key physical characteristics of the bag and objects for threat detection, elements within the feature vector may include factors such as: bag size, fill factor, or estimated mass of a specific object; and
(5) Pass the feature vector to a classification algorithm (for example, a decision tree or a neural network), which has been trained on a set of training data which allows it to make "threat/no-threat" determinations, and display this determination as a simple search or clear indicator to a security operator.

Features in the feature vector include: (estimated) masses and areas of organic, dense, and very dense materials; numbers of discrete metallic objects; the average depth of the bag from radar and optical techniques; and the estimated volume of non-trivial contents.

In one embodiment, a feature in the feature vector includes a likelihood that one or more objects within the item of baggage contains water. Advantageously, the false positive rate was found to significantly decrease when the feature vector included this feature. In one example, the false positive rate decreased from 20% to 12% (when the true positive rate was 95%). In another example, the false positive rate decreased from 15% to 6% (when the true positive rate was 90%).

Figure 5:
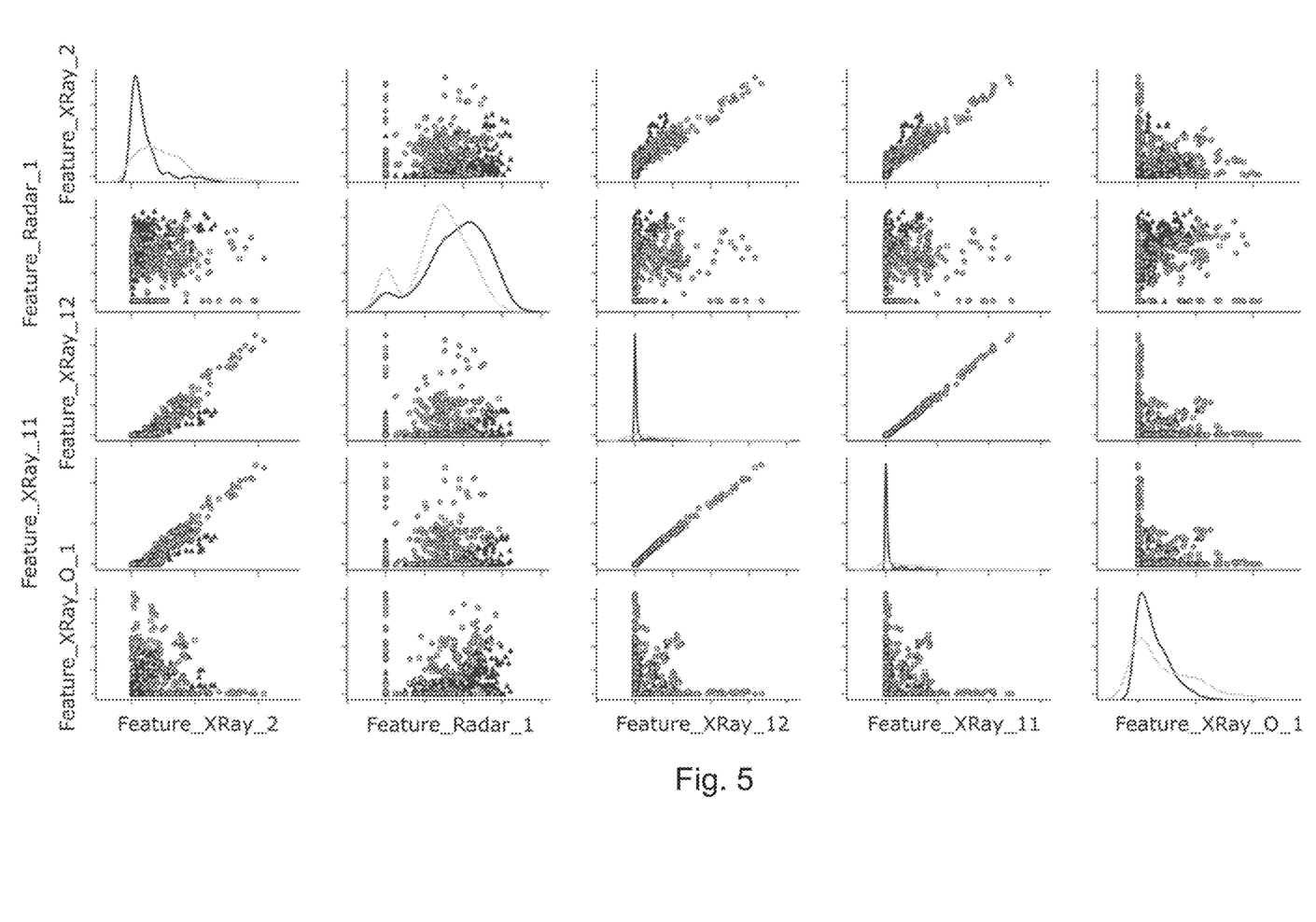
FIG. 5 shows a selection of some features from a feature vector plotted against each other as scatter plots.

Scatter plots of some of the major features plotted against each other can be seen in FIG. 5. The scatter plots clearly show that there are significant differences between the benign bags (triangle) and threat bags (circle).

Another form of output from the pre-processing is an attenuation/effective atomic number ($Z_{eff}$) space histogram. This is an alternative representation of the image, in which the data is replotted onto a grid of attenuation and $Z_{eff}$, with a heat map showing how many pixels fall into a particular attenuation/$Z_{eff}$ bin. Opaque, metallic objects generally occupy the upper right quadrant, while organic, low absorbing objects occupy the lower left quadrant.

Notably, this data is extracted only after insignificant heterogeneous regions have been removed from the bag and similar regions averaged to reduce noise. This both increases the degree of clustering and reduces inconsequential clutter in the image.

Figure 6:
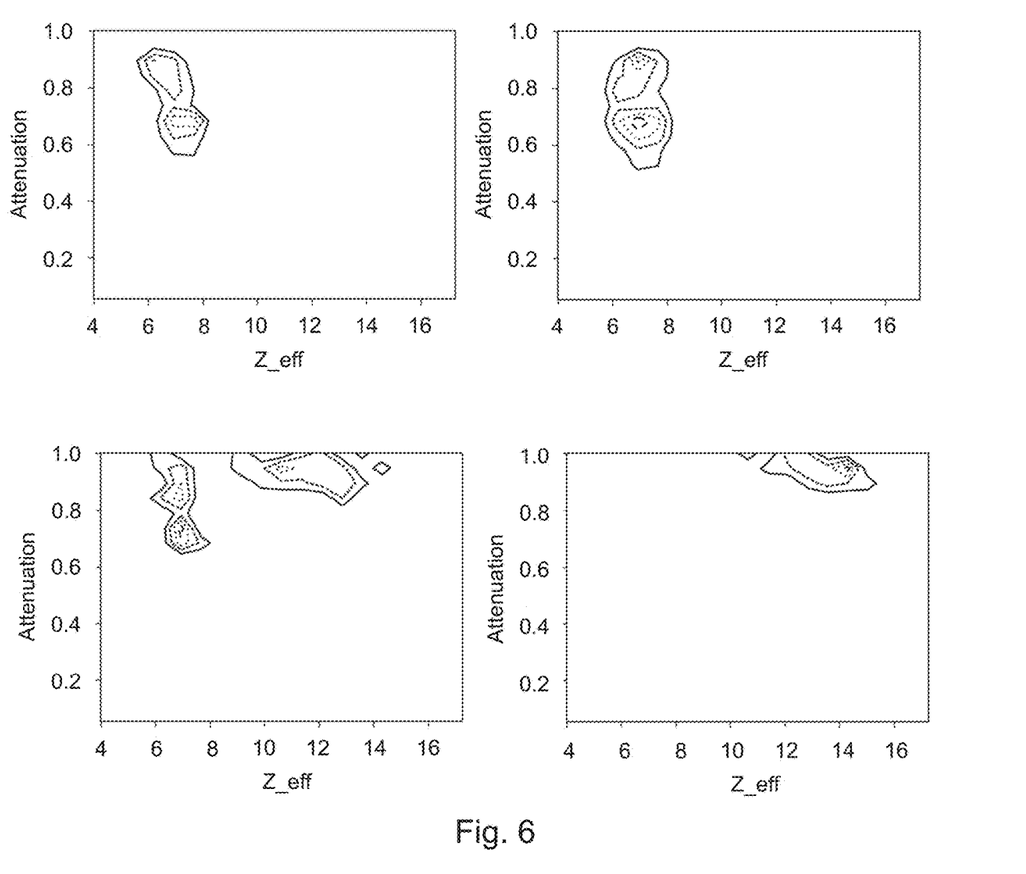
FIG. 6 shows four attenuation/effective atomic number space histograms for items of baggage known to contain threat items.
Figure 7:
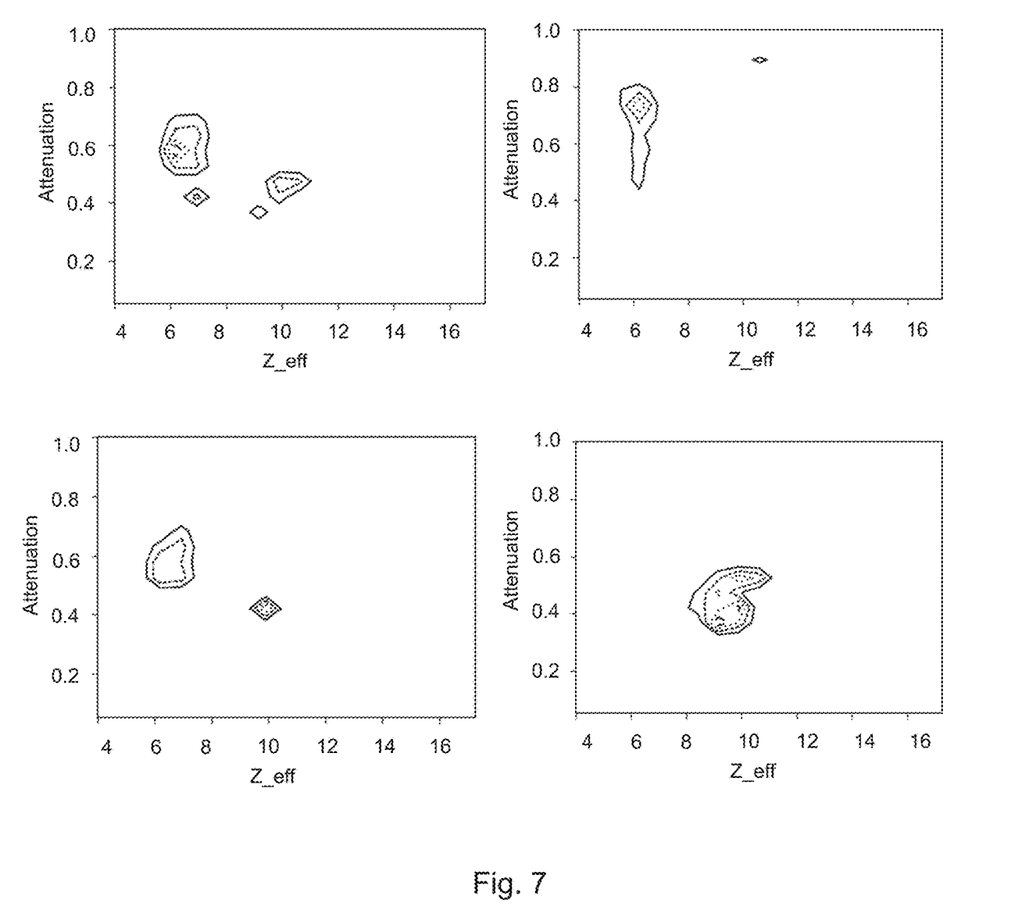
FIG. 7 shows four attenuation/effective atomic number space histograms for items of baggage known to contain only benign items.

FIG. 6 shows four attenuation/$Z_{eff}$ space histograms for items of baggage known to contain threat items. Whereas FIG. 7 shows four attenuation/$Z_{eff}$ space histograms for items of baggage known to contain benign items. Items of baggage containing threat items generally have one smaller dense cluster in the upper half or upper left portion of the space (representing a high quantity of one type of material). In contrast, items of baggage containing benign items generally have multiple, more varied clusters (representing several different types of material) in the lower half or lower left portion of the histogram.

A further alternative form of output is an image summarising the categorisation of key regions within the bag.

Figure 8:
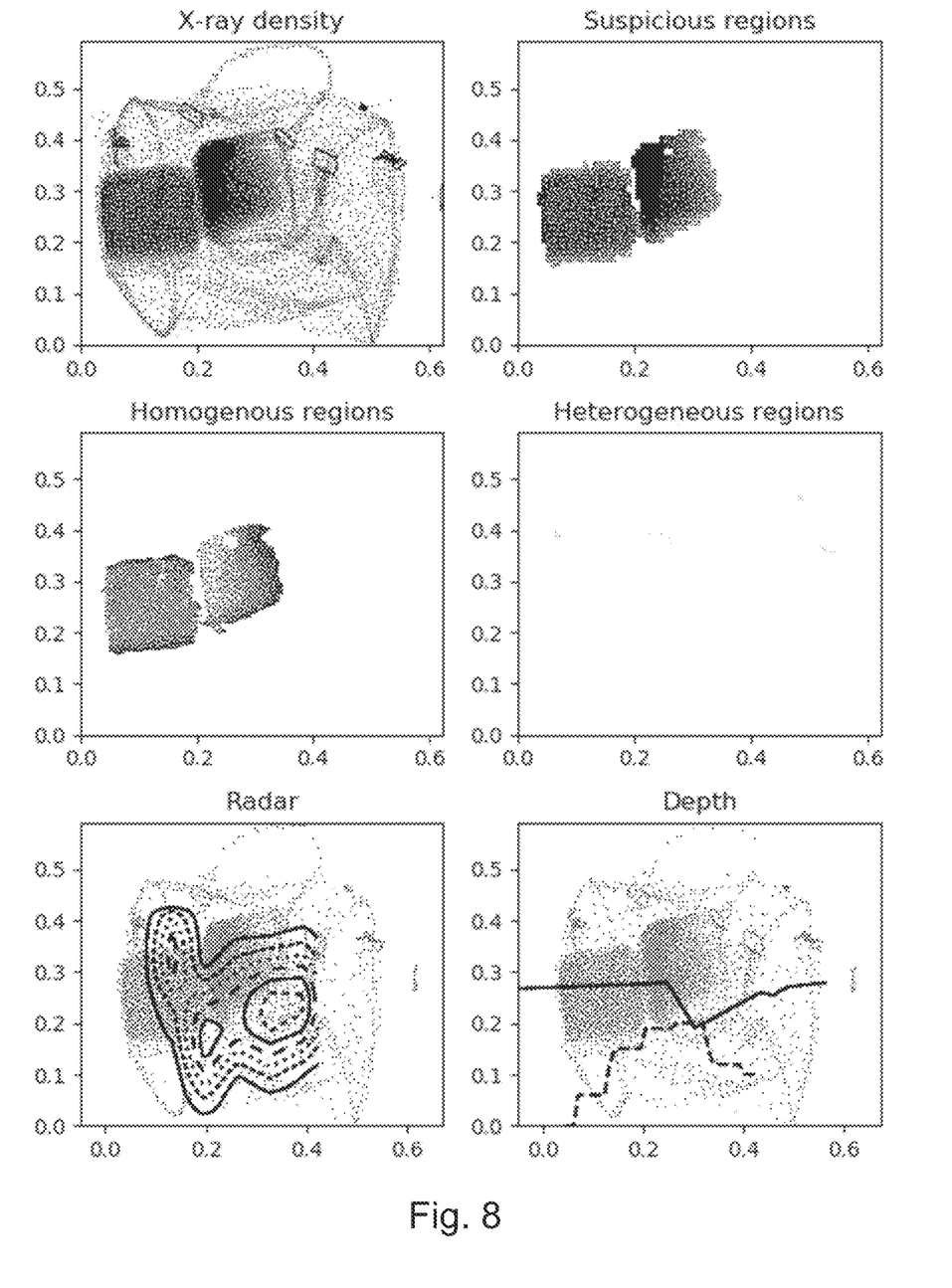
FIG. 8 shows a summary image of an item of baggage containing an object with a large amount of dense organic material.
Figure 9:
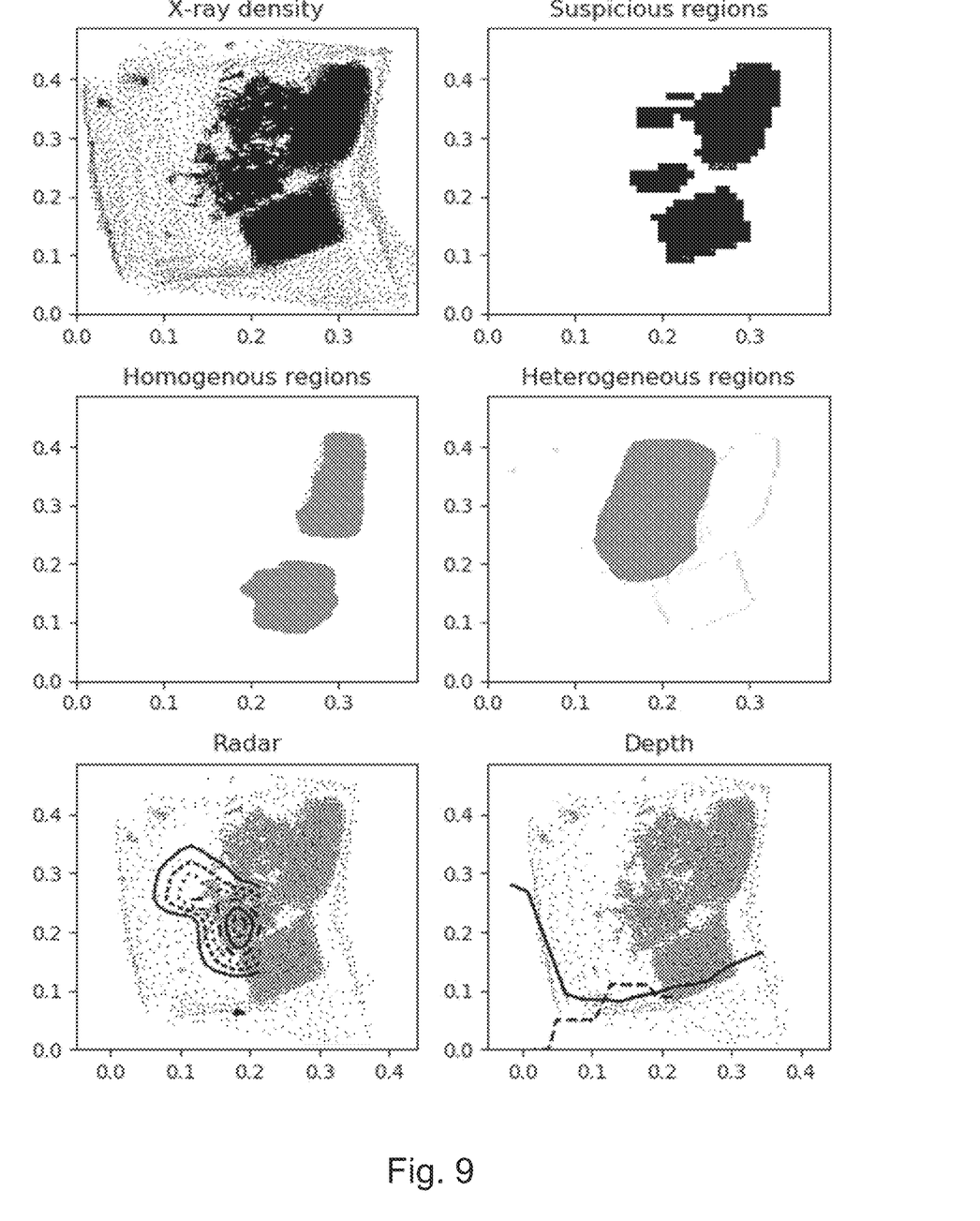
FIG. 9 shows a summary image of an item of baggage containing an object with dense inorganic material and metallic shrapnel.

A sample set of output images is shown in FIGS. 8 and 9. The upper left hand plot in each of these features is an x-ray density image, below which is a homogeneous region map. The homogeneous region map showing the location of homogenous regions. Adjacent each homogeneous region map is a heterogeneous regions map. The upper right plot of each figure shows any "significant" regions as identified by the processor. The lower two plots in each figure are the optical and radar auxiliary information, which has been described above. All x-ray data is generally shown as black and white attenuation information. FIG. 8 shows an example of an item of baggage with a large amount of dense organic material, whereas FIG. 9 shows an example of an item of baggage with dense inorganic material and metallic shrapnel.

Figure 10:
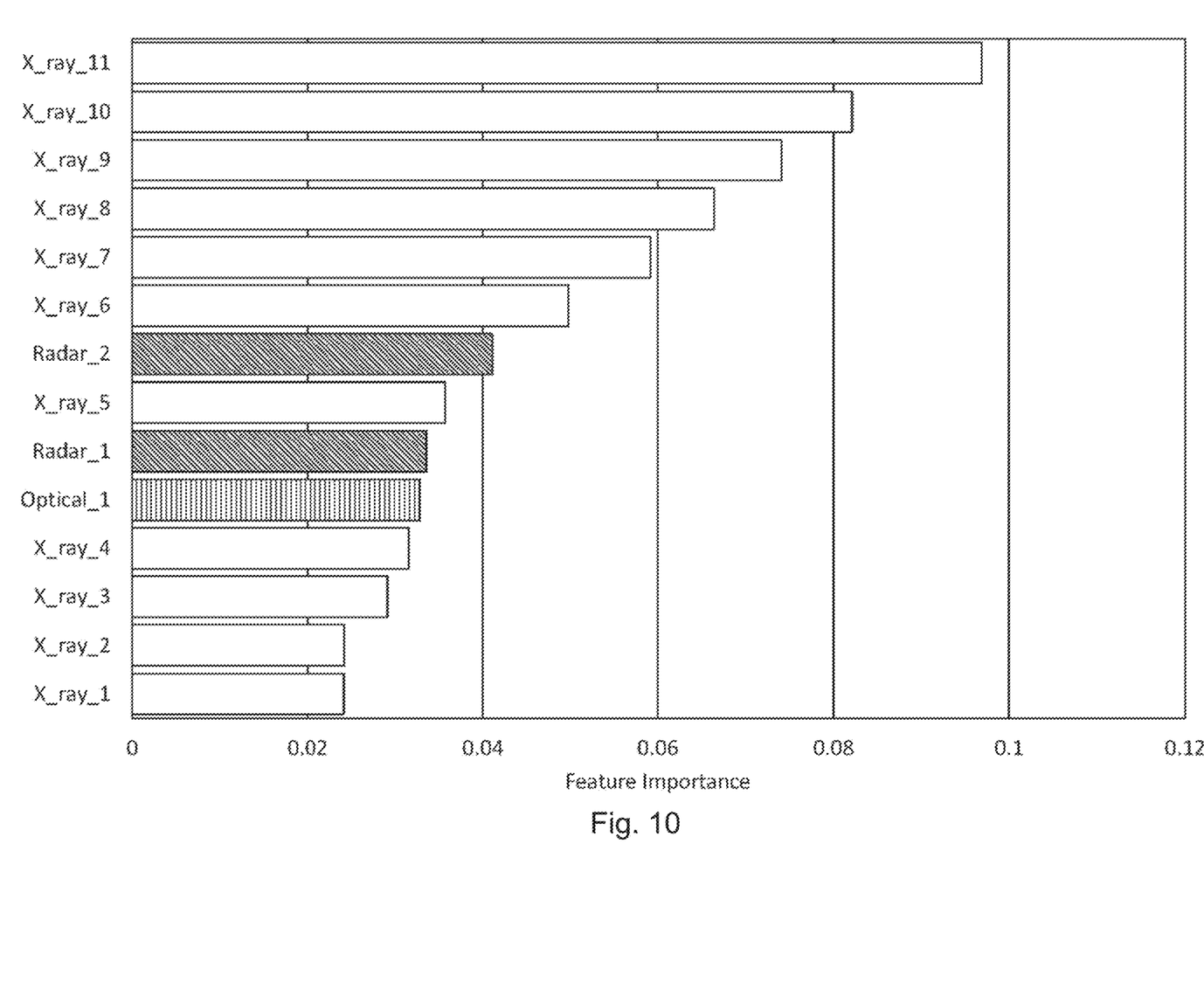
FIG. 10 shows a plot indicating the relative importance of features from different scanning devices in the feature vector.

Two approaches were used as examples of automatically classifying an item of baggage as either containing threat or benign objects. The first was using a decision tree classification, and the second was a neural network using the feature vector discussed above. FIG. 10 shows an example feature vector, indicating the relative importance of items within the feature vector. As can be seen, information derived from the radar (e.g. Radar_2) and information derived from the optical depth sensor (e.g. Optical_1) contribute meaningfully to the feature vector.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:
1. A device for screening items of baggage, comprising:
an x-ray scanner, configured to scan an item of baggage using x-ray radiation, and generate therefrom data indicative of objects within the item of baggage;
a second scanner configured to estimate a volume of the item of baggage;

a third scanner, configured to estimate a physical dimension of at least one object within the item of baggage, wherein the third scanner uses non-ionising radiation; and a processor, configured to utilize the data indicative of objects within the item of baggage, the estimated volume, and the estimated physical dimension of at least one object within the item of baggage to generate a risk estimation for the item of baggage, wherein the processor is further configured to generate an attenuation/effective atomic number histogram using the data indicative of objects within the item of baggage and is configured to use the attenuation/effective atomic number histogram when generating the risk estimation for the item of baggage.

2. The device of claim 1, wherein the third scanner is further configured to derive one or more additional physical properties pertaining to at least one object within the item of baggage.

3. The device of claim 1, wherein the one or more physical properties includes a complex dielectric constant of the or each object, electromagnetic scattering behaviour, and structural elements causing multiple reflections.

4. The device of claim 1, further comprising a conveyor, configured to move the item of baggage between a first scanning region associated with the first scanner, a second scanning region associated with the second scanner, and a third scanning region associated with the third scanner.

5. The device of claim 1, wherein the conveyor is configured to move the item of baggage at a speed of at least 0.6 m/s.

6. The device of claim 1, wherein the data indicative of objects within the item of baggage is an indication of a number of different objects within the item of baggage.

7. The device of claim 1, wherein the data indicative of objects within the item of baggage is an indication of a density of the or each object within the item of baggage.

8. The device of claim 1, wherein the second scanner is an optical depth sensor.

9. The device of claim 1, wherein the second scanner is a time of flight sensor.

10. The device of claim 1, further comprising a mirror, configured to reflect light emitted from the optical depth sensor onto a second scanning region.

11. The device of claim 1, wherein the physical dimension of the object is a depth of the object relative to a surface of the item of baggage closest to the third scanner.

12. The device of claim 1, wherein the third scanner is a radar scanner.

13. The device of claim 1, wherein the third scanner is a microwave radar scanner.

14. The device of claim 1, wherein the third scanner is configured to estimate the physical dimension of at least one object within the item of baggage whilst the item of baggage is also being scanned by the second scanner.

15. The device of claim 1, wherein the processor is configured to identify regions of interest in the item of baggage using a measured attenuation of the x-ray radiation.

16. The device of claim 1, wherein the processor is configured to identify organic regions, inorganic regions, and/or metallic regions in the item of baggage using a measured effective atomic number.

17. The device of claim 1, wherein the processor is configured to determine the likelihood that one or more objects within the item of baggage contains water.

18. The device of claim 1, wherein the processor is configured to:

generate a feature vector, using one or more of: an estimated mass and area of the or each organic and/or dense object within the item of baggage, a number of discrete metallic, organic, and/or inorganic objects within the item of baggage, an estimation of the degree to which the item of baggage is filled by the or each object contained therein, and an estimated volume of the or each object contained within the item of baggage; and utilise the feature vector to generate the risk estimation for the item of baggage.

19. The device of claim 1, wherein the feature vector further includes a likelihood that one or more objects within the item of baggage contains water.

20. The device of claim 1, wherein the processor is configured to use a machine learning algorithm to generate the risk estimation.

21. The device of claim 1, wherein the processor is configured to identify features of the item of baggage, based on the data indicative of objects within the item of baggage and the estimated volume of the time of baggage, characteristic of the item of baggage either being benign or containing a threat.

22. A method of screening items of baggage, using a device, comprising the steps of:

scanning the item of baggage using an x-ray scanner and thereby generating data indicative of objects within the item of baggage;

estimating the volume of the item of baggage using a second scanner;

estimating a physical dimension of at least one object within the item of baggage lusing a third scanner, wherein the third scanner uses non-ionising radiation; and generating, by a processor, a risk estimation based on the data indicative of objects within the item of baggage, the estimated volume, and the estimated physical dimension of at least one object within the item of baggage; and generating an attenuation/effective atomic number histogram using the data indicative of objects within the item of baggage and is configured to use the attenuation/effective atomic number histogram when generating the risk estimation for the item of baggage.

23. A kit, installable in an x-ray scanner, comprising:

an optical depth sensor, configured to estimate a volume of an item of baggage;

a radar scanner, configured to estimate a physical dimension of at least one object within the item of baggage; and a processor, configured to utilize:

data indicative of objects within the item of baggage, which is provided by the x-ray scanner, the estimation of the volume of the item of baggage, and the estimation of a physical dimension of at least one object within the item of baggage;

so as to generate a risk estimation for the item of baggage.

* * * * *